United States Patent [19]
Froment

[11] Patent Number: 5,255,719
[45] Date of Patent: Oct. 26, 1993

[54] CONNECTORS FOR JOINING CONNECTING RODS WITH LEVERS FOR CONTROLLING HEDDLE FRAMES IN WEAVING LOOMS

[75] Inventor: Jean-Paul Froment, Doussard, France

[73] Assignee: S.A. Des Etablissements Staubli (France), Faverges, France

[21] Appl. No.: 882,557

[22] Filed: May 13, 1992

[30] Foreign Application Priority Data

May 15, 1991 [FR] France .................. 91 06066

[51] Int. Cl.⁵ .............................. D03C 9/00
[52] U.S. Cl. ......................... 139/82; 74/105; 403/297
[58] Field of Search .......... 403/297; 139/82, 83, 139/84, 66 A, 1 E; 74/105, 103

[56] References Cited

U.S. PATENT DOCUMENTS

| 892,333 | 6/1908 | Traub ................................ 403/297 |
| 4,556,337 | 12/1985 | Marshall ........................ 403/297 |

FOREIGN PATENT DOCUMENTS

| 2201812 | 6/1973 | Fed. Rep. of Germany ........ 139/82 |
| 2103504 | 7/1992 | Fed. Rep. of Germany ...... 403/297 |
| 2162598 | 12/1972 | France . |
| 2607155 | 12/1986 | France . |

*Primary Examiner*—Andrew M. Falk
*Attorney, Agent, or Firm*—Dowell & Dowell

[57] ABSTRACT

Connectors which are removably mounted within connecting rods which are used to assemble the rods to levers for controlling the movement of heddle frames in a weaving loom and which include expandable jaws for securing the connectors within the rods.

10 Claims, 4 Drawing Sheets

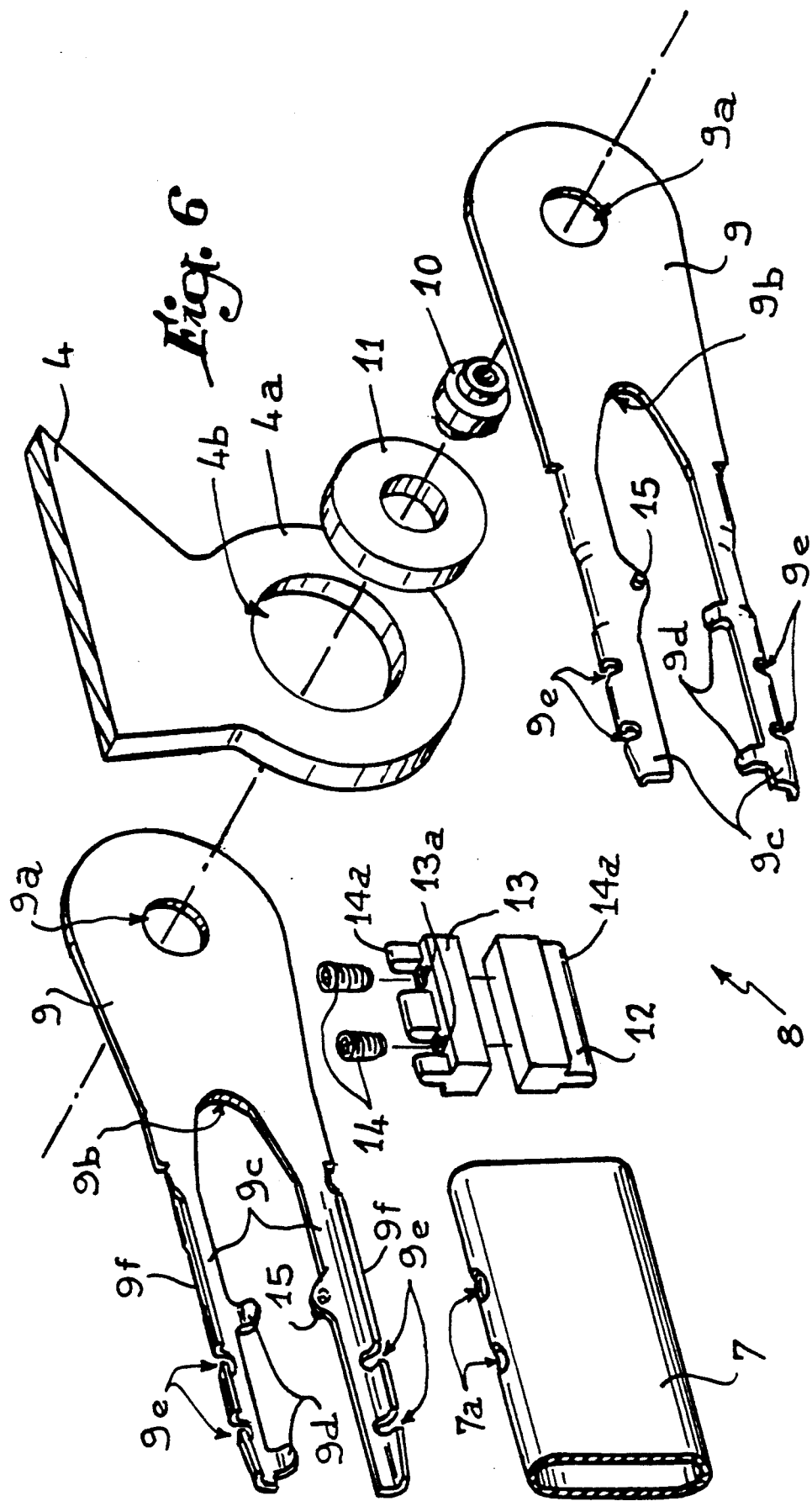

CONNECTORS FOR JOINING CONNECTING RODS WITH LEVERS FOR CONTROLLING HEDDLE FRAMES IN WEAVING LOOMS

BACKGROUND OF THE INVENTION

1. Field of the Invention

The present invention relates to dobbies and other mechanisms for forming the shed on weaving looms, and it is directed more particularly to the drawing mechanisms of the connecting rod type which ensure coupling of the moveable actuation members of such a mechanism with the vertically displaceable heddle frames mounted on the loom.

2. History of the Related Art

In order to make matters clear, FIG. 1 of the accompanying drawings very schematically shows the general arrangement of a drawing mechanism of the type in question. In this FIGURE, reference 1a designates one of the actuation members of a dobby 1, while reference 2 corresponds to one of the heddle frames mounted on the weaving loom. It may be observed that, to ensure the articulated connection between the elements 1a and 2, the drawing mechanism includes at each frame 2, a series of connecting rods 3 oriented either horizontally or vertically, or obliquely, which are coupled to one another with the aid of oscillating levers 4 mounted side by side along fixed horizontal pins 40.

In the current technique as illustrated in FIGS. 2 and 3, each of the ends of each connecting rod 3 are in the form of a tube of flattened section which is cut out axially to form a terminal fork, between the flanges 3a of which is introduced a corresponding end of the oscillating lever 4. The pivoting assembly is operated with the aid of an intermediate ring or pivot 5 of circular profile, whose retention in an opening in the lever 4 is effected by a central rivet 6.

It should be noted here that such a structure creates a weakened zone, with the result that, having regard to the forces transmitted by the drawing mechanism, to the operational speeds imparted at the present time to the weaving mechanisms and to the difficulties of lubricating the assembly, ruptures frequently occur at the connecting rod/lever couplings. In addition, it will be noted that assembly by riveting opposes any dismantling, with the result that, in the event of a damaged coupling, it is necessary to replace a series of pieces.

SUMMARY OF THE INVENTION

It is a principal object of the present invention to overcome these drawbacks with the aid of a novel connecting rod/lever coupling system which ensures reinforcement of the zone envisaged without increasing the weight of the connecting rod, and this while allowing easy dismantling and re-assembly.

The invention consists principally in engaging inside the end of each connecting rod in the form of a tube with flattened section, a connector which includes at one of its ends, two longitudinal plates arranged to allow assembly of the pivot intended for coupling of the corresponding lever, and to allow connection of the connector and the connecting rod with the aid of two deformable blocking jaws which are provided opposite the plates and which penetrate inside the connecting rod and cooperate with spacer or expander screws accessible through perforations made in the wall of the connecting rod.

BRIEF DESCRIPTION OF THE DRAWINGS

The accompanying drawings, given by way of example, will enable the invention, the characteristics that it presents and the advantages that it is capable of procuring, to be more readily understood:

As has already been indicated above, FIG. 1 shows the type of drawing mechanism to which the invention refers, while

FIG. 6 is a view in perspective illustrating the arrangement of the pieces which are used in the coupling shown.

DESCRIPTION OF THE PREFERRED EMBODIMENTS

Figure 1:
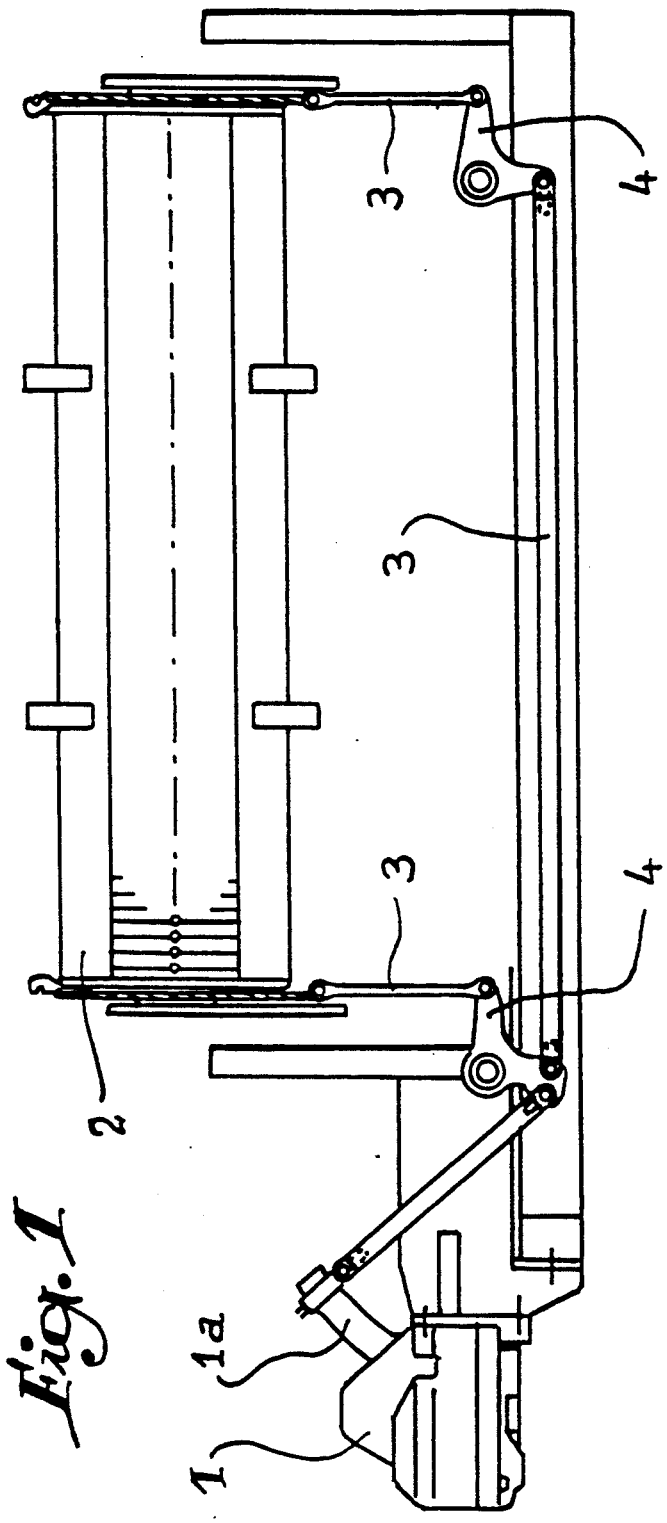
Figure 2:
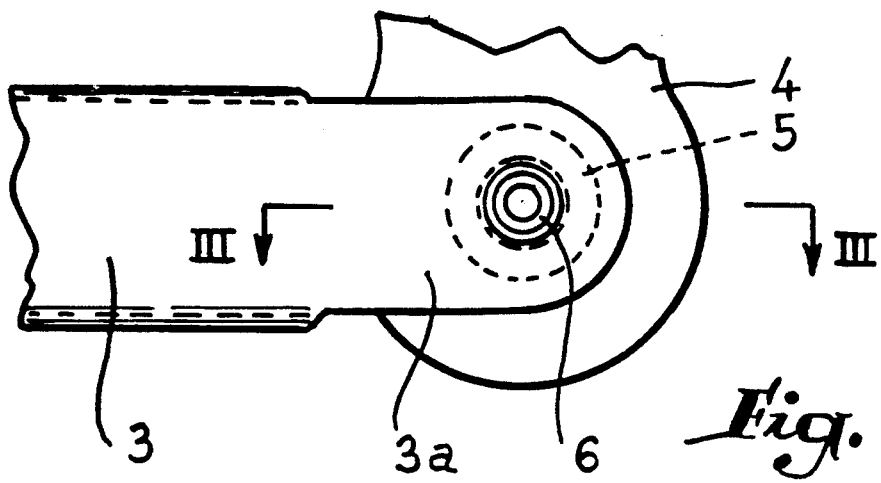
FIGS. 2 and 3 show the known prior art.
Figure 3:
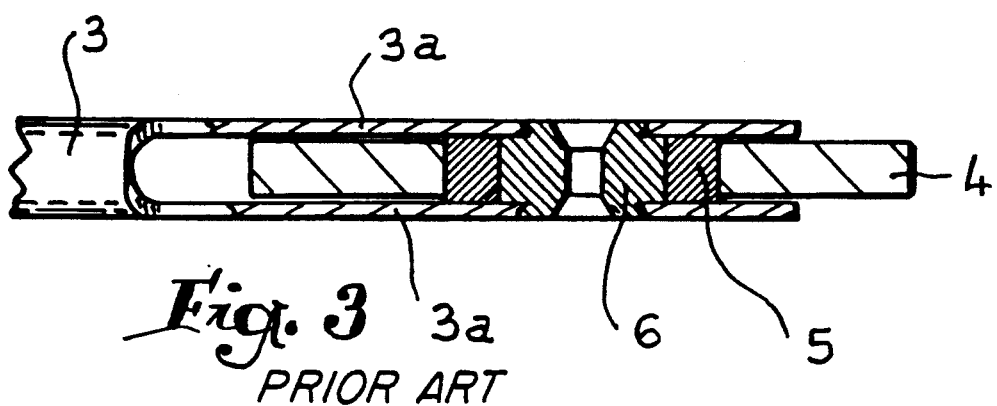

FIGS. 4 to 7 indicate at 7 the end of a connecting rod which, in manner known per se, has a tubular profile of flattened section. The end 7 is intended to be coupled to the lower flange 4a of one of the oscillating levers 4 of the drawing mechanism.

Figure 4:
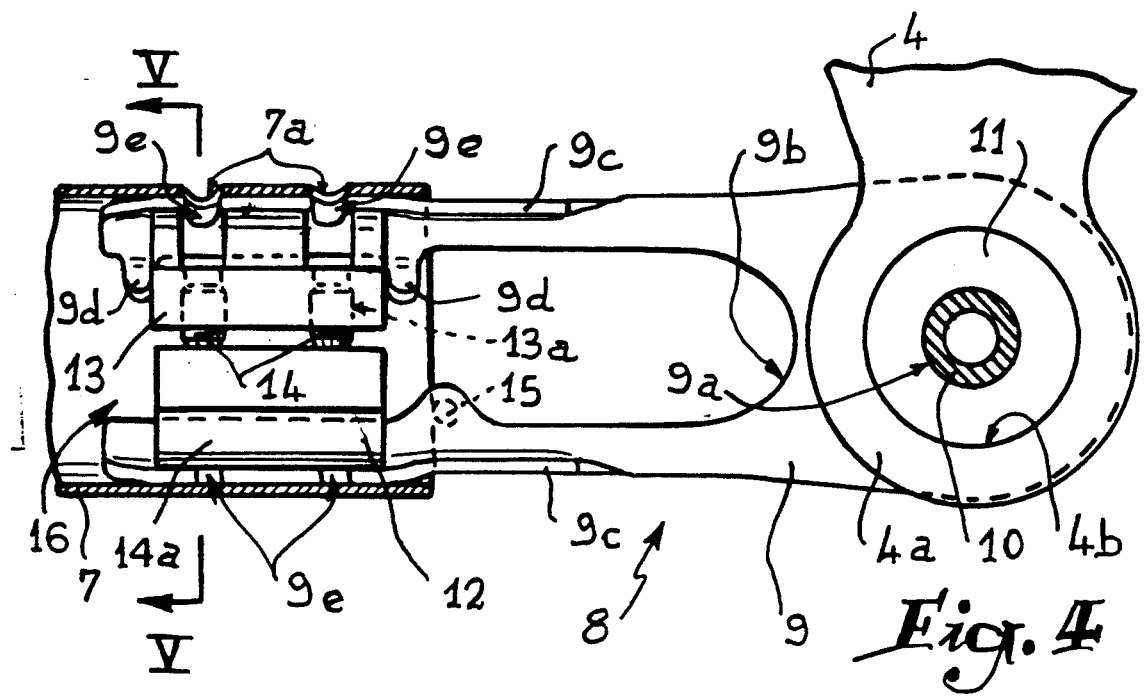
FIG. 4 is a longitudinal section of one of the connecting rod/lever coupling systems of a drawing mechanism according to the invention.
Figure 5:
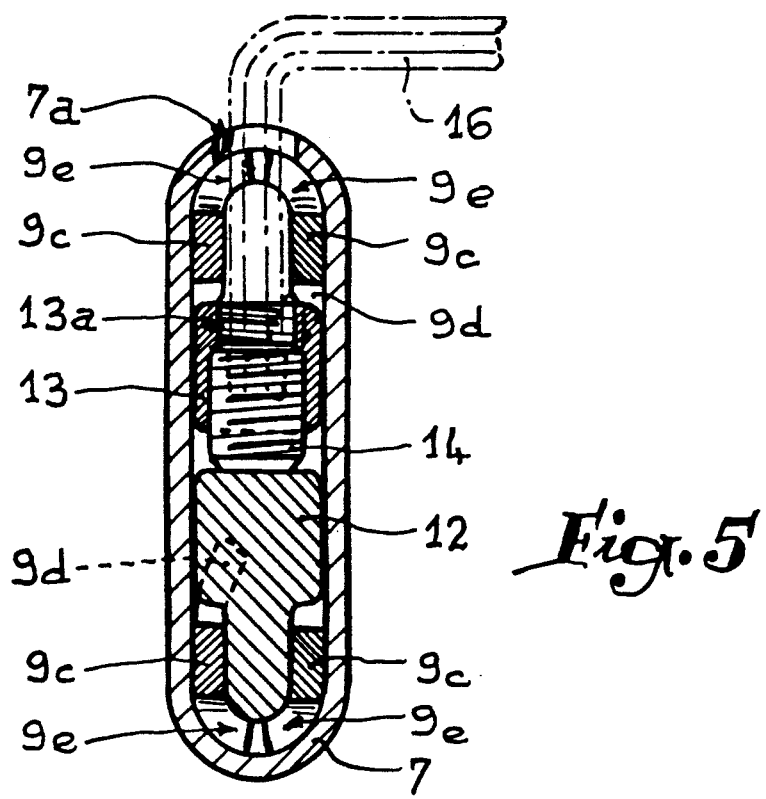
FIG. 5 is a transverse section along the plane indicated at V—V in FIG. 4.

For such coupling, the invention employs a connector 8 which, in the embodiment illustrated in FIGS. 4 to 6, is constituted by two plates 9 which, as set forth hereinafter, are profiled at one of their ends to engage axially in the terminal opening of the end of the connecting rod 7. As shown more particularly in FIG. 6, the opposite end of each plate 9 includes a hole 9a which is intended to cooperate with a tubular rivet 10, which passes through a socket or bearing introduced in an opening 4b in the flange 4a of the lever 4. After caulking of the ends of the rivet 10, the lever 4 is joined to the two plates 9 of the endpiece 8.

Opposite hole 9a, each plate 9 has an axial notch 9b cut therein, which defines two longitudinal flanges 9f, each of them being axially divided to form two parallel jaws referenced 9c. It should be observed here that these flanges present in transverse section a curved or arcuate profile which extends over approximately an angular amplitude of 60° to 90° so that they are applied closely against the inner wall of the end of the connecting rod 7, as illustrated in FIG. 5, to perform a function of blockage, as will be seen hereinafter. With the four jaws 9c of the two plates 9 are associated expander means 16 with two expander elements 12 and 13 constituted by outwardly engaging surfaces or studs 14a whose outwardly facing edges are shaped to abut against the inner wall of the jaws 9c; it will be noted that the pusher 13 includes two transverse tappings 13a adapted to cooperate with two spacer screws 14, in the manner which will be described hereinafter.

The two expander elements 12 and 13 are intended to be engaged one above the other between the jaws 9c of the two plates 9 once they are disposed parallel to each other inside the end of connecting rod 7. Penetration of the plates is limited by a small stop 15 carried by a tongue of one of the jaws. The expander elements 12 and 13 are suitably positioned between the two plates 9 by oblique tabs 9d provided on one of the jaws 9c of each of the plates, this positioning being such that the screws 14 come into register with transverse accesses formed by notches 9e made in the flanges 9f and with two perforations 7a made in the wall of the end of connecting rod 7.

Under these conditions, it will be appreciated that the screws 14 are thus capable of being adjusted with the aid of a wrench such as 16 (FIG. 5) engaged through the perforations 7a. The end of each screw 14 bears against the opposite longitudinal wall of the expander element 12, so that the two expander elements 12 and 13 are spaced apart by force. Due to the elastic deformability given by the central notch 9b of each plate 9, the spacing of the expander elements 12 and 13 ensures application of the jaws 9c against the inner wall of the end 7 of the connecting rod and connection of the rod and the plates 9 which form the permanent.

It should be observed that such connection is not permanent, since it suffices for the operator to unscrew the screws 14 to release the jaws 9c by the expander elements 12 and 13 and thus to allow extraction of the end 7. The connector is thus capable of being easily replaced in the event of rupture or damage.

Moreover, it will be noted that the weight of the assembly formed by the connecting rod 7 and its two connectors 8 is substantially reduced with respect to the prior art, as the connectors 8 substantially reinforce the zone of coupling of the connecting rod on the oscillating lever and, for the construction of this connecting rod 7, a tubular section of lesser thickness may thus be employed.

Figure 7:
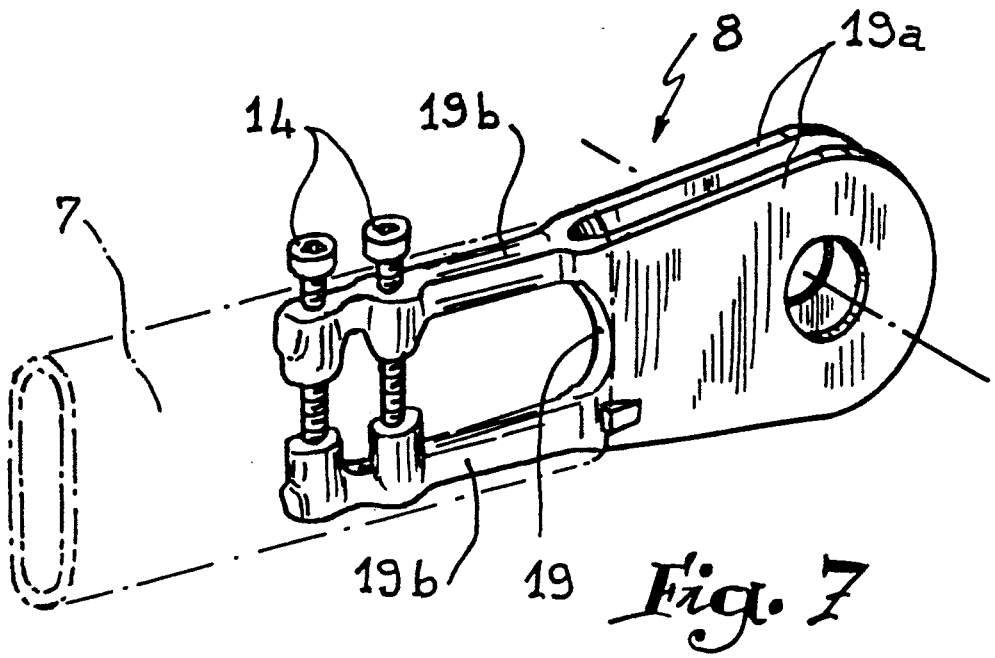
FIG. 7 shows a variant embodiment of the invention.

FIG. 7 illustrates a variant embodiment of the invention in which each connector is formed, no longer by two separate plates 9 as set forth hereinabove, but by a single piece 19 which is sectioned to comprise two parallel extensions 19a in the form of plates, and two elastically deformable parts 19b which face rearwardly in order to constitute blocking jaws once introduced in the end of the connecting rod 7. These jaws 19b are equipped with two space or expander screws 14 which are engaged in tappings made in one of the jaws 19b and whose free end is applied against the bearing surfaces provided on the other jaws 19b.

It must, moreover, be understood that the foregoing description has been given only by way of example and that it in no way limits the domain of the invention which would not be exceeded by replacing the details of execution described by any other equivalents.

I claim:

1. An apparatus for connecting a connecting rod to a lever for controlling the movement of a heddle frame in a weaving loom, wherein the connecting rod has an open end, the apparatus comprising, a connector having first and second ends, means for pivotally connecting said first end to said lever, said second end including a pair of spaced jaws which are deformable relative to one another, said jaws being of a size to be cooperatively received within the open end of the connecting rod, adjustable expander means disposed between said jaws of said second end of said connector, and means for adjusting said expander means toward said pair of spaced jaws to thereby force said spaced jaws outwardly relative to one another, whereby when said second end is placed within the open end of the connecting rod, said jaws may be selectively forced into secure engagement with said connecting rod.

2. The apparatus of claim 3 in which said connector includes a pair of plate means, each of said plate means having first and second ends and each having said spaced jaws said expander means being mounted between said plate means so as to be engageable with each of said jaws of said second ends of said plate means.

3. The apparatus of claim 2, in which each of said jaws includes an arcuate flange, said flanges of one of said place means opposing said flanges of the other of said plate means.

4. The apparatus of claim 3, in which on of said jaws of each of said plate means includes tabs for mounting said expander means between said plate means.

5. The apparatus of claim 3, in which said expander means includes a pair of elements having outer engaging surfaces for engaging said flanges of said jaws, an opening through one of said elements, and screw means mounted within said opening in said one of said elements and extending into an abutting relationship with the other of said elements.

6. The apparatus of claim 5, including at least one access opening defined between said flanges of said jaws of said pair of plate means which is aligned with said screw means, whereby access is available to said screw means.

7. The apparatus of claim 6, in which said connector includes at least one stop means extending outwardly therefrom, said stop means functioning to limit the penetration of said connector within the open end of the connecting rod.

8. The apparatus of claim 2, in which said means for pivotally connecting said first end to said lever includes an opening in each of said first ends of said plate means and a pivot assembly extending therethrough.

9. The apparatus of claim 1, in which said connector includes at least one stop means extending outwardly therefrom, said stop means functioning to limit the penetration of said connector within the open end of the connecting rod.

10. The apparatus of claim 1, in which said first end of said connector includes a pair of spaced and generally parallel plates having aligned openings therethrough, an opening through one of said jaws, and said expander means including a screw means extending through said opening in said one of said jaws and abutting said other of said jaws.

* * * * *